L. DUNNING.
SAFETY DEVICE FOR AUTOMOBILES.
APPLICATION FILED JAN. 15, 1920.
1,356,053.
Patented Oct. 19, 1920.
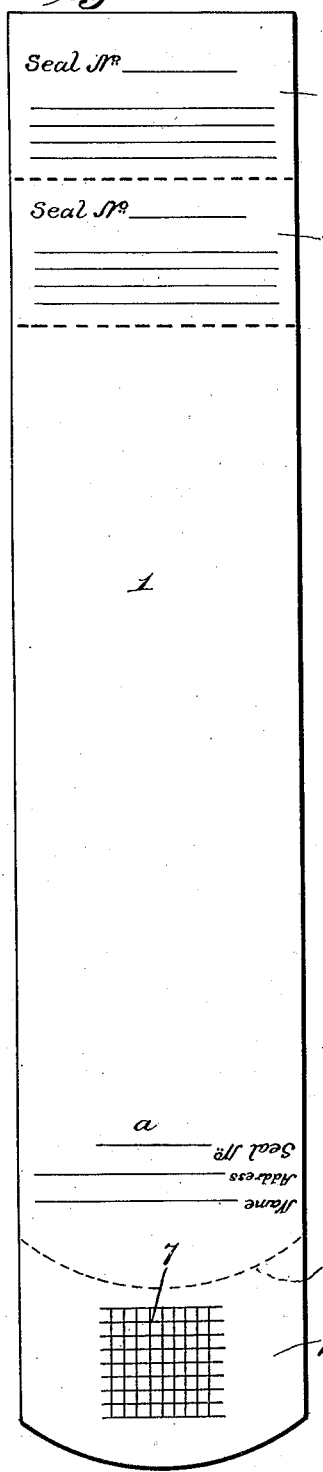
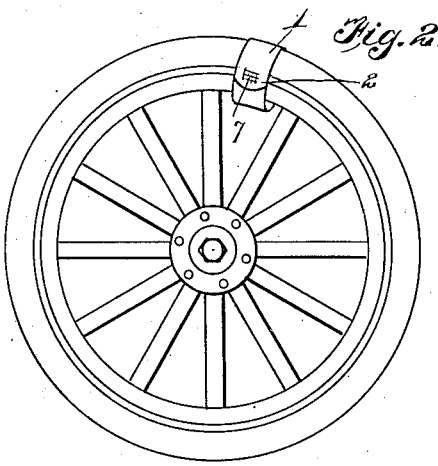
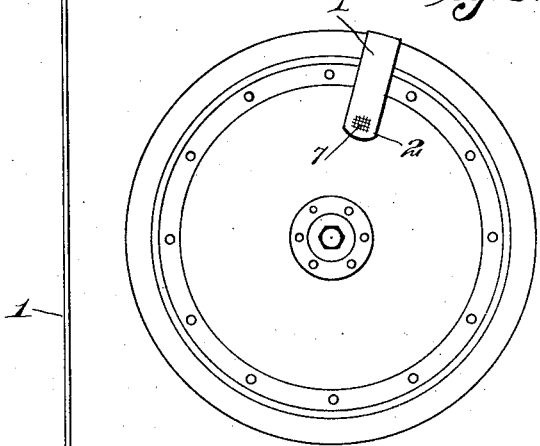
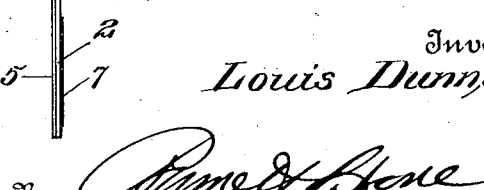
Inventor
Louis Dunning

UNITED STATES PATENT OFFICE.

LOUIS DUNNING, OF BLOOMINGTON, ILLINOIS.

SAFETY DEVICE FOR AUTOMOBILES.

1,356,053.  Specification of Letters Patent.  Patented Oct. 19, 1920.

Application filed January 15, 1920. Serial No. 351,688.

*To all whom it may concern:*

Be it known that I, LOUIS DUNNING, a citizen of the United States, residing at Bloomington, in the county of McLean and State of Illinois, have invented new and useful Improvements in Safety Devices for Automobiles, of which the following is a specification.

This invention relates to a device for the detection of unauthorized use of automobiles, or other vehicles, and particularly when the latter are placed in storage, either temporarily or permanently, in public garages, or the like, although the same may be used for the desired purpose whenever the vehicle is left unattended or otherwise not in use by the owner.

The primary object of the invention is to provide a device of the character mentioned, and one of comparatively simple and inexpensive construction, such as is extremely easy in application to the control devices of an automobile, or to one of the wheels thereof, or of other wheeled vehicles.

Another object of the invention is to provide a device of the type, aforesaid, and one of a nature which is readily adapted for use on new tires in stock, for the detection of any substitutions, as of smaller sizes for larger ones; cheaper grades or makes for more expensive ones, etc., such as sometimes occurs through the manipulation of dishonest employees, as well as for the purposes hereinbefore mentioned.

A further object of the invention is to provide such a device with identifying means, such as will be an absolute check for the prevention of the substitution of one of the devices for another, in the event of the original device having been tampered with or removed or destroyed, without proper authority.

With these and other objects in view, the invention resides in the features of construction and arrangement of parts as will be hereinafter more fully described, set forth in the claims, and illustrated in the accompanying drawing; in which:—

Figure 1 is a top plan view of the preferred form of the device.

Fig. 2 is a side elevation of a spoked wheel showing the mode of application of the same thereto.

Fig. 3 is a side elevation of a disk, or inclosed form of vehicle wheel showing a slightly modified form of the invention applied thereto.

Fig. 4 is a fragmentary detail of a wheel, similar to that of Fig. 3, showing a further mode of application of the preferred form of the invention thereto.

Fig. 5 is an edge view of a modified form of the invention.

Referring to the drawing and more particularly to Fig. 1 thereof, the preferred form of the invention is shown to consist of an elongated body or sheet 1 of relatively strong paper, or other suitable flexible material, the same being formed to provide, at one end, a tongue portion 2, integral with the intermediate portion, and, at its opposite end, with detachable portions or coupons 3 and 4. The intermediate portion of the body or sheet 1, immediately adjacent the tongue portion 2, is provided with line data $a$, for the reception of the name and address of the owner of an automobile or other vehicle, contracting for the storage of his automobile or other vehicle, together with a serial number. (Seal No.). The detachable portions 3 and 4 are likewise provided with line data for the reception of similar memoranda, and for any information or instructions regarding the contract for storage of the automobile or vehicle, or, in the case of identification of tires alone, may have size, cost and make entered thereon. The coupons 3 and 4 are likewise marked with the serial number of the body or sheet. The tongue portion 2 is provided on its under face with a film of suitable adhesive 5, by means of which the tongue may be engaged on the opposite end portion of the body or sheet 1, when the device is placed in operative position.

In the use of the device, when the owner of a vehicle desires to place his car in a garage for the night, or for any other period of time, he or the garage owner provides one of the devices or seals, filling out the line data as hereinbefore indicated, the coupons 3 and 4 are detached, coupon 3 being retained by the owner of the automobile or vehicle, and the coupon 4 by the garage owner. The body or sheet 1 is now encircled around the desired part of the control devices of the automobile, one of the wheels thereof, or around a tire casing, as the case may be.

In Fig. 2, the device or seal is shown in position on a spoked wheel, the seal strip or body being passed between the spokes and around the felly, rim and tire, and the gummed tongue moistened, and applied to the opposite end thereof.

In Fig. 3, the seal strip is shown as applied to a disk or inclosed type of wheel, and in this case, a corresponding adhesive film 6 (Fig. 5) is provided on the under or corresponding face of the body or sheet 1 with that having the adhesive film 5, immediately adjacent the detachable coupon 4, so that the strip is passed over the tire and is secured to opposite sides of the wheel.

In Fig. 4, there is shown a wheel structure similar to that of Fig. 3, and, in this instance, the body or sheet 1 is to be severed at a point immediately removed from the line data $a$, and the latter portion secured directly to the tread portion of the tire by the adhesive of the tongue portion 2.

To detect such attempts as may be made for the unauthorized removal of the device from its operative position, it is contemplated to apply a suitable film 7 of any material capable of being affected by moisture, such as indelible ink, to a portion of the upper or outer surface of the sheet 1, preferably at a central point on the tongue 2, such as will spread to other portions of the sheet should moisture, steam or the like be applied to unseal the tongue for the removal of the seal strip.

From the foregoing, it will be obvious that the invention provides for a very simple and inexpensive device, easy of application, and of a nature to absolutely check the misuse of automobiles, or other vehicles, in garages, etc., or which will indicate such attempt misuse, and which will tend to reduce such practices as now commonly obtain much to the annoyance of vehicle owners, and ofttimes expenses in damage resulting therefrom, to a minimum. Furthermore, if a vehicle, with the seal in use on a wheel thereof, or engaged over one or more of the several control devices, as on an automobile, is actually used, such use will result in damage to or total destruction of the seal, so that the detection is absolute, and by reason of the serial number on the coupons corresponding to that on the body or sheet, a new seal cannot well be substituted to avoid such detection.

It is to be noted that the intermediate portions of the body or sheet 1 may be utilized for the printing thereon of various advertising matter, or for such other data as a vehicle or garage owner may desire.

Having thus fully described my invention, what I claim, is:—

1. A device of the character described comprising a strip of flexible material formed to provide a tongue portion at one end and detachable portions at the opposite end thereof, similar identifying means on the intermediate portion of the strip and on each of said detachable portions, said strip being adapted for engagement around the felly, rim and tire of an automobile wheel after said detachable portions have been removed therefrom, a film of adhesive on the under surface of said tongue portion for securing the latter to the opposite end of said strip, and a film of coloring matter on a portion of the upper surface of said tongue, said film of coloring matter being affected by any subsequent moistening of the adhesive film for the unauthorized removal of the strip from the wheel and spreading to normally uncolored portions of said tongue portion.

2. A device of the character described comprising a strip of flexible material formed to provide detachable portions at one end thereof, similar identifying means on an intermediate portion of the strip and on said detachable portions, said strip being adapted for engagement over the tread of an automobile wheel after said detachable portions have been removed therefrom, and films of adhesive on the under surface of said strip and at opposite ends thereof, one of said films extending inward for a short distance from the line of severance of the inner of said detachable portions, said films of adhesive being adapted, when moistened, for securing the ends of said strip to opposite sides of the automobile wheel.

In testimony whereof I affix my signature.

LOUIS DUNNING.